United States Patent [19]
Biava et al.

[11] 4,390,775
[45] Jun. 28, 1983

[54] AUTOMATIC AND SELF-ADAPTING PROCESS FOR FUSION-WELDING A JOINT BETWEEN TWO SURFACES

[75] Inventors: Dominique Biava, Clamart; Jean Cornu, Nantes; Jean-Marie Detriché, Chambourcy; Richard Galera, Meylan; Bernard Tiret, Verdun; Paul Marchal, Gif sur Yvette, all of France

[73] Assignee: Commissariat a l'Energie Atomique, Paris, France

[21] Appl. No.: 234,362

[22] Filed: Feb. 13, 1981

[30] Foreign Application Priority Data

Feb. 13, 1980 [FR] France .................................. 80 03152

[51] Int. Cl.$^3$ .............................................. B23K 9/12
[52] U.S. Cl. ............................ 219/124.34; 219/125.1
[58] Field of Search ...................... 219/124.22, 124.34, 219/125.1

[56] References Cited

U.S. PATENT DOCUMENTS

| | | | |
|---|---|---|---|
| 4,115,684 | 9/1978 | Lindbom | 219/124.22 |
| 4,124,792 | 11/1978 | Flora et al. | 219/124.34 |
| 4,215,299 | 7/1980 | Edwin et al. | 219/124.34 |

FOREIGN PATENT DOCUMENTS

| | | |
|---|---|---|
| 17167 | 3/1980 | European Pat. Off. |
| 2397916 | 2/1979 | France. |
| 946990 | 1/1964 | United Kingdom. |
| 1078240 | 8/1967 | United Kingdom. |

OTHER PUBLICATIONS

E. A. Gladkov et al., *Automatic Welding*, vol. 26, No. 9, pp. 60–62, 9/1973.
G. A. Spynu et al., *Automatic Welding*, vol. 29, No. 12, pp. 45–47, 12/1976.

*Primary Examiner*—C. C. Shaw
*Attorney, Agent, or Firm*—Kerkam, Stowell, Kondracki & Clarke

[57] ABSTRACT

The invention relates to an automatic and self-adapting process for fusion-welding a joint between two surfaces, with the aid of a welding head which essentially comprises a joint detector and a torch supported by a carrier mobile along the joint. This welding head is mobile in rotation about a main axis related to the carrier and substantially perpendicular to the plane tangential to the surfaces to be welded at the location of the joint, and mobile in translation along this main axis. The torch and the detector are mobile in rotation about a secondary axis related to the head and parallel to the main axis and the torch is able to pass through the main axis in the course of its rotation about the secondary axis.

A reference direction for all the degrees of freedom of the head is defined when the above-mentioned axes as well as the axes of the torch and the detector are in the same plane.

This process is characterized in that it consists:
 in recording the electric voltage corresponding to the angular position of the reference direction;
 in measuring, in the course of welding and for each position of the holder, the angle of the detector with respect to the reference direction of the head, when the detector is above the joint;
 in correcting, during the operations following the trial operation, the angular position of the torch when the latter occupies the position previously occupied by the detector, by an angular displacement which is a function, on the one hand, of the angular deviation of the detector with respect to the corresponding reference direction at this point of the joint and, on the other hand, of the speed of displacement of the head on its path.

The invention relates also to an automatic device for carrying out this process.

17 Claims, 9 Drawing Figures

AUTOMATIC AND SELF-ADAPTING PROCESS FOR FUSION-WELDING A JOINT BETWEEN TWO SURFACES

The present invention relates to an automatic, self-adapting process for fusion welding and to a device for carrying out this process.

It is known that the development of robotics corresponds to an industrial need for developed means, making it possible to increase production, reduce organising and planning restraints in manufacture, and to reduce the investments and risks run by the personnel in executing certain dangerous work.

To make simple welds, enabling the same machine to weld different pieces, it is known to use programmed welding devices which are qualified as "industrial robots." However, their programming only makes it possible to follow a path in space when the welding precision is compatible with the positioning, tolerance and deformation of the pieces to be welded. This results in that these programmed devices are generally used only for welding operations on assemblies where the required precision is low and which do not require high-quality welds. These programmed devices replace, in certain cases, specific machines studied to weld identical pieces in series. Existing welding robots cannot adapt themselves to the random displacements going beyond the low tolerances which may be obtained due to the process and to the device of the invention.

The purpose of the process and device of the invention is to remedy these drawbacks and in particular to effect welding with suitable precision; to this end, the welding torch is set with respect to the joint, sufficiently independently from the deviations in position of the torch holder for these deviations to be compensated at any moment.

The invention enables work to be carried out which could only be effected by highly qualified personnel, for example the assembly of a large number of elements with high precision without possibility of re-run or error. The invention also ensures intensive production, which is impossible to obtain from an operator due to the fatigue and physical stress which this entails. It also enables large-dimensioned pieces, which are often preheated, to be welded which the welder can only approach if he is wearing protective clothing, thus rendering his work extremely difficult under sometimes unhealthy conditions. It also enables welding operations to be carried out by remote control, with a sufficient precision which is generally not obtained by remote manipulators controlled via a television circuit.

The invention relates firstly to an automatic and self-adapting process for fusion-welding a joint between two surfaces, with the aid of a welding head which essentially comprises a joint detector and a torch supported by a carrier mobile along the joint, this welding head being, on the one hand, mobile in rotation about a main axis related to the carrier and substantially perpendicular to the plane tangential to the surfaces to be welded at the location of the joint, and, on the other hand, mobile in translation along this main axis, the torch and the detector being mobile in rotation about a secondary axis related to the head and parallel to the main axis, the torch being able to pass through the main axis in the course of its rotation about the secondary axis, the detector being in advance with respect to the torch during the displacement of the holder, a reference direction for all the degrees of freedom of the head being defined when the above-mentioned axes as well as the axes of the torch and the detector are in the same plane; this process is characterised in that it consists:

in recording, during a trial operation prior to welding in series, the successive positions of the holder along the joint; in determining for each of these positions in the course of this operation the direction of a straight line defined by the two points of intersection of the axis of the torch and of the axis of the detector with the outline of the joint on the surfaces of the pieces to be assembled and in recording the electric voltage corresponding to the angular position of this reference direction;

in measuring, in the course of welding and for each position of the holder, the angle of the detector with respect to the reference direction of the head, when the detector is above the joint;

in correcting, during the operations following the trial operation, the angular position of the torch when the latter occupies the position previously occupied by the detector, by an angular displacement which is a function, on the one hand, of the angular deviation of the detector with respect to the corresponding reference direction at this point of the joint and, on the other hand, of the speed of displacement of the head on its path.

According to another feature of the invention, the speed of displacement of the holder is determined from the intensity of the welding current.

According to a further feature, the height of the torch above the joint is permanently controlled by the arc voltage.

According to another feature, the height of the torch with respect to the joint is adjusted by a proximity detector.

The invention also relates to an automatic, self-adapting device for welding a joint, comprising a welding head provided with a torch, supported by a holder mobile along the joint to be welded; this device is characterised in that it comprises a joint detector forming part of the welding head, this head being, on the one hand, mobile in rotation about a main axis related to the holder and substantially perpendicular to the plane tangential to the surfaces to be welded at the location of the joint and, on the other hand, mobile in translation along this axis, the joint detector being mobile in rotation about a secondary axis related to the head and parallel to the main axis, the torch passing through the main axis, in the course of its rotation about the secondary axis and the detector being in advance with respect to the torch during the displacement of the holder, means connected to the head, to the torch and to the detector for measuring and recording during a trial operation the electric voltages corresponding to the angular positions of the elements subjected to movements of rotation, located with respect to a reference direction which, for the detector and for the torch, is the plane defined by the main axis and the secondary axis and which, for the head, is a direction chosen arbitrarily with respect to the holder, means for locating and recording in the course of welding and for each predetermined position of the holder, the angular displacement of the detector, with respect to its reference direction, when the detector is opposite the joint, and means for correcting, in the course of welding, the angular position of the torch with respect to its corresponding reference direction, when the torch occupies the position occupied previously by the detector along the joint, this correction consisting in an angular displacement of the torch bringing said torch onto the joint, and being a function of the speed of displacement of the head on its path.

According to another feature of the invention, the device further comprises means for rotating the head about the main axis and for displacing it in translation along this axis.

According to a further feature, the device comprises means for bringing the detector above the joint, during the trial operation and in the course of welding, by rotation about the secondary axis of the head, and means for measuring the angular position of the detector with respect to its reference direction.

According to another feature, the means for correcting the position of the torch comprise means for controlling its rotation about the secondary axis from the voltages corresponding to the positions of the detector when it is on the joint and from the speed of the head on its path.

According to another particular feature, the speed of the head on its path is measured by means for measuring the welding current.

According to a further feature, the means for controlling the rotation of the torch about the secondary axis are controlled by the means for measuring the speed of displacement of the holder.

According to a further feature of the invention, the system comprises means for adjusting the height of arc of the torch.

According to another feature, the means for adjusting the height of arc comprise means for displacing the head in translation along the main axis, controlled by means for measuring the arc voltage or proximity detection means.

According to another feature, the detector is an optical detector with reciprocating scanning.

According to another feature, the detector is a reciprocating-scanning detector of eddy current type.

According to a further feature, the detector is a detector capable of being centered on the joint.

The invention will be more readily understood on reading the following description with reference to the accompanying drawings, in which:

FIG. 1 very schematically shows an automatic welding device according to the invention.

FIG. 2 schematically shows at (a) and (b) the principle of correction of the positions of the torch and of the detector.

Figure 8:
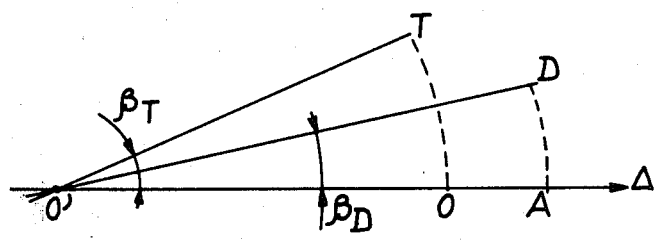

FIG. 8 enables the angle of correction of the position of the torch to be calculated.

Figure 9:
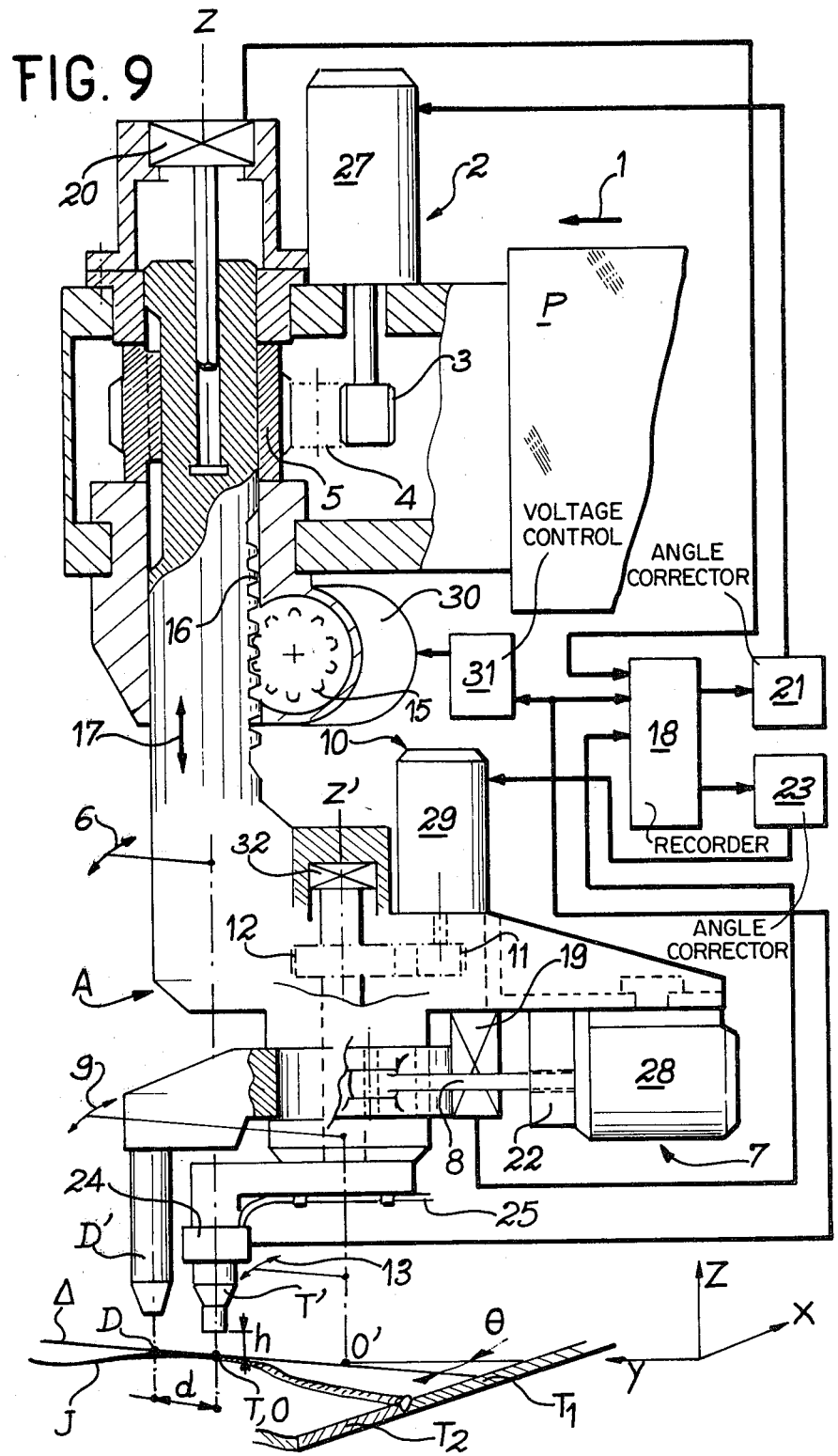

FIG. 9 shows in greater detail an automatic device according to the invention.

Figure 1:
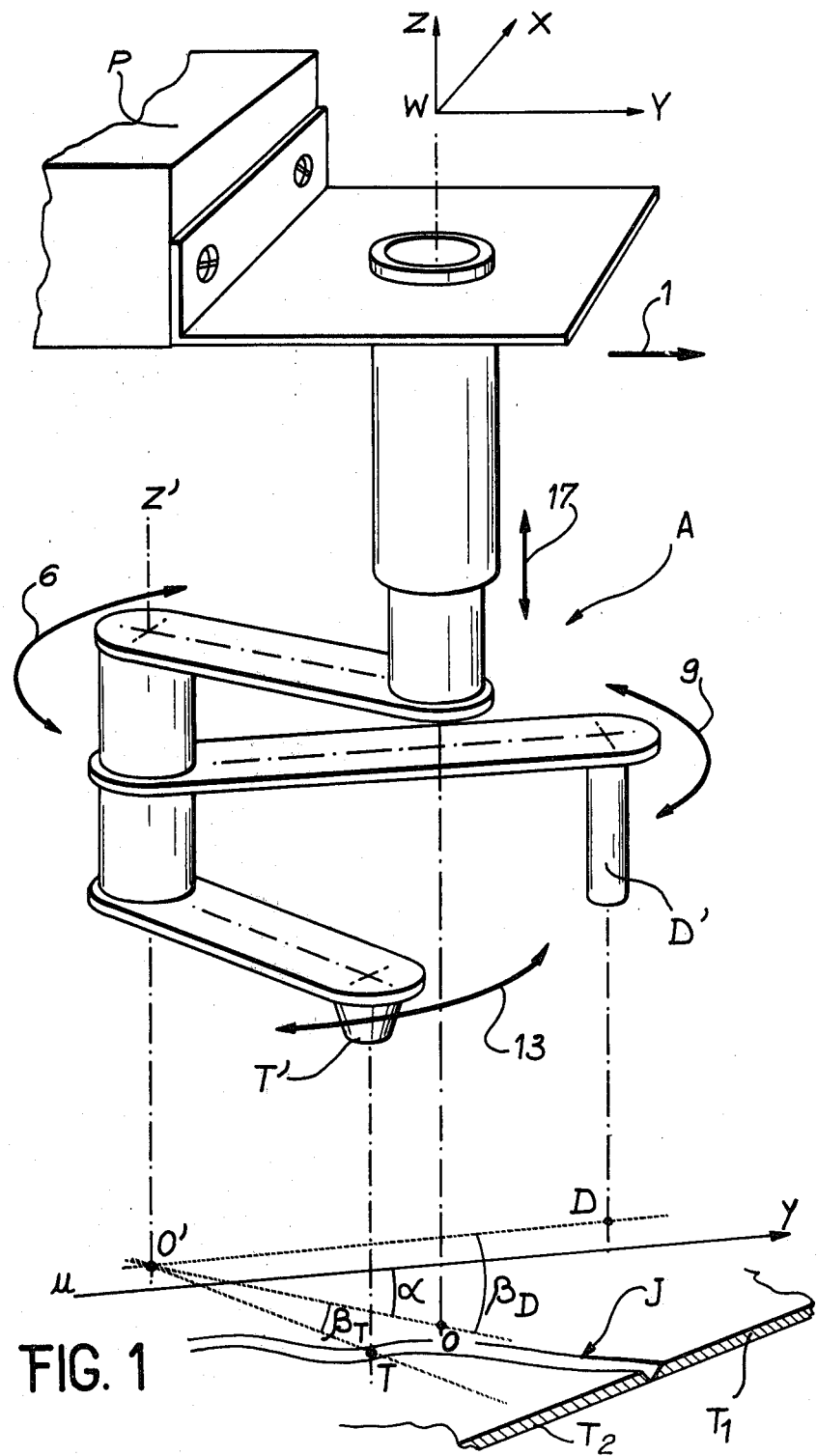

Referring now to the drawings, FIG. 1 very schematically shows an automatic welding device according to the invention, allowing the welding of a joint J between two surfaces $T_1$ and $T_2$ constituted for example by sheets to be welded. This system comprises a holder P, mobile along the joint to be welded. The positions of the holder are located with respect to a fixed reference mark WXYZ; it supports a welding head A which comprises a torch T', adapted to produce an electric arc, and a detector D' of optical or eddy current type, for example, which enables the presence of the joint to be detected each time this detector and this joint are located opposite each other. The welding head A is mobile in rotation about the main axis OZ, related to the holder P, and substantially perpendicular to the surfaces $T_1$ and $T_2$. The detector D' and the torch T' are mobile in rotation about a secondary axis O'Z', parallel to the main axis OZ. The arrangement of the torch is such that, in the course of its rotation about the secondary axis O'Z', this torch passes through the main axis OZ. During the displacement of the holder in the direction of arrow 1, for example, the detector is located in front of the arrow. The device also comprises means (not shown in this Figure, which will be described in detail hereinafter), for rotating the head A about the main axis OZ in one of the directions indicated by the double arrow 6, as well as means for bringing the detector D' above the joint J by rotations about the secondary axis O'Z'. These rotations in fact constitute oscillations of the detector about the axis O'Z', in the directions of double arrow 9. Similarly, means which will be described in detail hereinafter enable the rotation of the torch T' about the secondary axis O'Z' to be controlled, in one of the directions indicated by double arrow 13, so as to bring this torch opposite the joint J. Finally, means which will be described in detail hereinafter enable the head A to be displaced in translation along the main axis OZ, in one of the directions of double arrow 17.

The holder P mobilizes the welding head A, in order to cause it to follow the joint to be welded. This holder may for example be the slave arm of a remote manipulator reproducing with high precision all the movements of a master arm. Each movement of the holder is ensured by an electric motor with which is associated a potentiometer which gives position information with respect to the reference mark WXYZ. As will be seen in detail hereinafter, all the positions of the torch, the head and the detector are located by potentiometers so that an angle of rotation is translated by a variation in electric voltage, proportional to the angular displacement. The functioning of the device is based on the principle of trial: upon recording, an operator effects a first welding operation on a model piece. As will be seen hereinafter, the different parameters of this operation are recorded, i.e. the voltages of the potentiometers locating the different movements as well as the welding parameters. At restitution, the recorded data are restored to reproduce the welding operation on a piece identical to the model piece. This operation may be repeated as often as necessary. Between the operation of recording and the operation of restitution, deviations occur, due for example to the deformations of the pieces, this requiring a reset of the position of the torch. If will be seen hereinafter how this reset is effected. The greatest deviation is the one appearing between the joint and the torch, in the course of welding, as, at the end of the torch, the joint no longer exists and is replaced by a zone of molten metal. In this situation, a professional welder uses his visual memory to guide the torch. With the automatic device of the invention, it is the indications of the joint detector, located in front of the torch, which enable this torch to be guided. The head is mobile with respect to mark WXYZ, related to the holder. The rotations of the torch and of the detector about the secondary axis O'Z' are independent. O', T, D and O designate in this Figure the outlines in the plane of the joint of the secondary axis Z', the torch T', the detector D' and of the main axis OZ. $\alpha$ designates the angle of rotation of O'O with respect to the axis uy parallel to WY, $\beta_t$ designates the angle of rotation of O'T with respect to OO', and $\beta_D$ the angle of rotation of O'D with respect to OO'.

A reference direction $\Delta$ of the head is defined when $\beta_T = \beta_D = 0$; this reference direction of the head corresponds to the alignment of O', T and D, point T being merged with point O.

Figure 2:
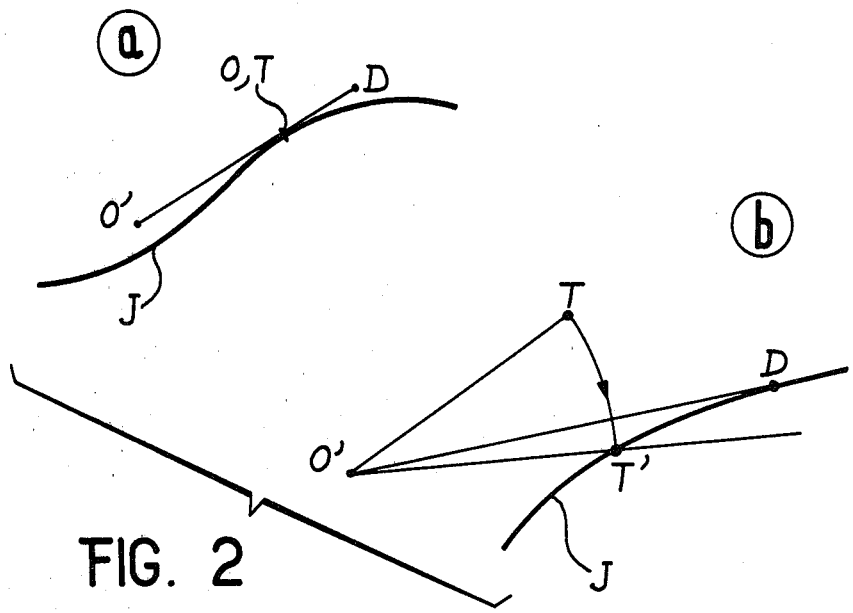

The principle of correction of the position of the torch is schematically illustrated at (a) and (b) in FIG. 2. This principle of correction consists, as shown at (a), in bringing the reference direction O', T, D (O being merged with T) of the head, on the tangent at O, to joint J. This may be effected by a general rotation of the head A so that T is on the joint J. An error on the position of T would be translated by an error on the direction O'T. As shown at (b) in FIG. 2, to return the torch on the joint J, it suffices at instant $t_2$ to rotate O'T through an angle T'OT; this angle is proportional to the one through which the detector had to rotate to find joint J, at an instant $t_1$ preceding instant $t_2$ upon displacement of the holder. In this Figure, T' represents the real point to be welded on the joint J.

The time gap $t_2 - t_1$ corresponds to the ratio of the distance between the torch and the detector when they are aligned on the reference direction, to the speed of advance of the torch. This ratio is an approximation, but is justified as the corrections to be made on the position of the torch are small (small angles) and slowly variable in time. The distance TD between the torch and the detector when they are aligned on the reference direction is constant.

It appears difficult, on recording, to bring together all the conditions which are necessary for the corrections when welding a joint; these conditions are as follows, during welding: the torch must be on the joint and the reference direction $\Delta$ must be secant to the joint at T and D. It is reasonable to impose that the torch be on the joint and blocked in reference position. Moreover, it is reasonable to impose that the reference direction $\Delta$ be substantially tangent to the joint, so that the latter remains in the pick up zone of the detector, in front of the torch. Thus, when the detector has located the joint, the direction TD is correct. It is with respect to this reference direction that the principle of correction is applicable, this direction is calculated then recorded and, at restitution, it suffices to return the angle of this direction with respect to WY (parallel to uy in the Figure) on the general control of rotation of the welding head.

Figure 3:
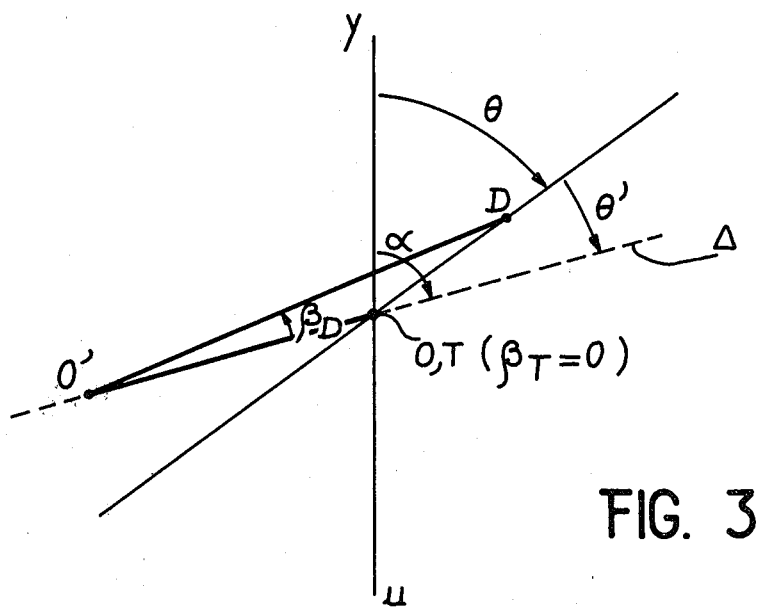
FIG. 3 shows the angles involved in defining a reference direction $\Delta$.

FIG. 3 schematically shows the different angles involved in calculating the angle $\theta$ which is the angle between the direction WY and the direction $\Delta$ (reference calculated and recorded). The angle $\theta$ designates in this Figure the angle made by the straight line passing through T and D at the instant when the detector passes over the joint, with respect to the direction uy parallel to the axis WY of the mark WXYZ. The angle $\theta'$ is the angle made by the direction OD with respect to the reference direction $\Delta$; angle $\alpha$ is the angle between the reference direction and the direction uy; finally, $\beta_D$ designates the angle between the reference direction $\Delta$ and O'D. The points T and O are merged and this results in the angle $\beta_T$ between O'T and the reference direction $\Delta$ being equal to 0.

Figure 4:
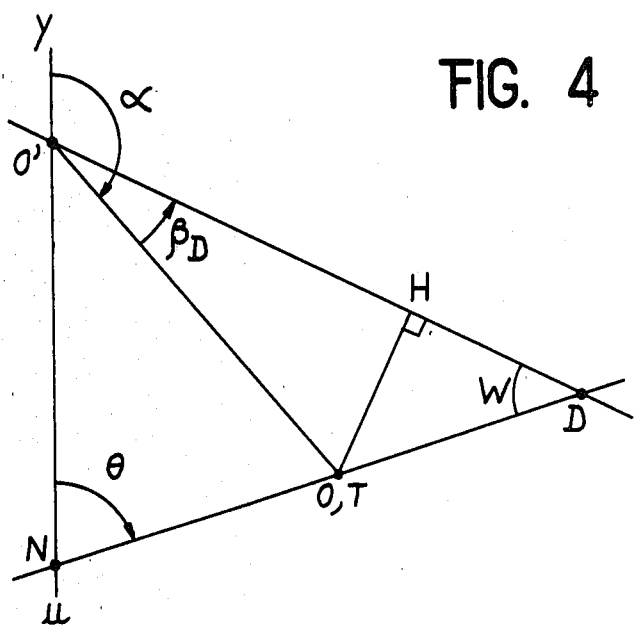
FIG. 4 shows the angles involved in calculating the angle of the reference direction $\Delta$ with respect to an axis relating to the holder.

FIG. 4 shows the points O', T and D in the plane of the joint as well as the different characteristic angles which are involved in defining the angle $\theta$ which is recorded, then restored upon control of rotation of the welding head, during restitution for a welding operation.

In the diagram of FIG. 4, if H denotes the projection of point O on the straight line passing through O' and through D, it is possible to write:

$$\theta + \pi - (\alpha - \beta_D) + w = \pi$$

or: $\theta = \alpha - \beta_D - w$ $$\text{and } \tan w = \frac{HT}{HD} = \frac{O'T \cdot \sin\beta_D}{O'D - O'H} = \frac{O'T \cdot \sin\beta_D}{O'D - O'T \cdot \cos\beta_D}$$

This results in:

$$\theta = \alpha - \beta_D - \text{Arc tan} \frac{O'T \cdot \sin\beta_D}{O'D - O'T \cdot \cos\beta_D}$$

Thus, it is possible, knowing $\alpha$, $\beta_D$, the distances O'T and O'D, to record the value of the angle $\theta$. Upon restitution, this angle will be the one existing between the reference direction WY of the holder and the direction OO'. The conditions will then be the conditions necessary for application of the principle of correction of the position of the torch, the reference direction $\Delta$ then being parallel to the secant to the joint at T and D.

Figure 5:
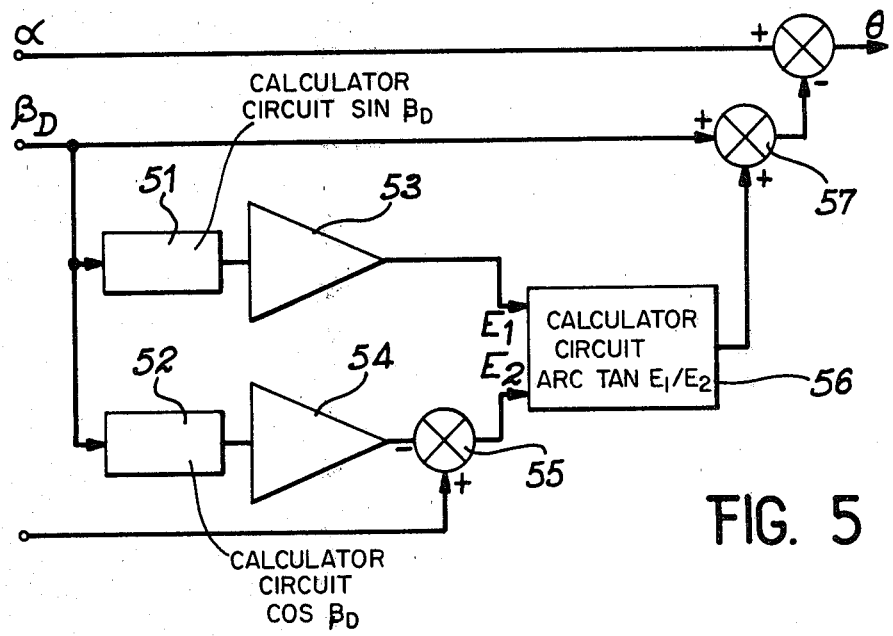
FIG. 5 is a correction circuit for obtaining the value of this angle.

FIG. 5 shows a circuit for obtaining the value of the angle $\theta$, as a function of $\alpha$, $\beta_D$, O'D and O'T, according to the calculation set forth in relation with FIG. 4. This circuit receives at its inputs the values $\alpha$, $\beta_D$, O'T. Means 51, 52 constituted in known manner enable the values $\sin \beta_D$ and $\cos \beta_D$ to be obtained, whilst multiplier circuits 53, 54 enable the values O'T $\sin \beta_D$ and O'T $\cos \beta_D$ to be obtained. The subtractor 55 enables value O'D $-$ O'T.$\cos \beta_D$ to be obtained. A circuit 56, constituted in known manner, makes it possible to calculate the ratio arc tan $E_1/E_2$, i.e. the ratio:

$$\text{arc tan} \cdot \frac{O'T \sin\beta_D}{O'D - O'T \cos\beta_D}$$

The adder 57 adds to the result obtained at the output of the circuit 56 the value of the angle $\beta_D$; the subtractor circuit 58 then makes it possible to obtain the value:

$$\theta = \alpha - \beta_D - \text{arc tan} \frac{O'T \sin\beta_D}{O'D - O'T \cos\beta_D}$$

Figure 6:
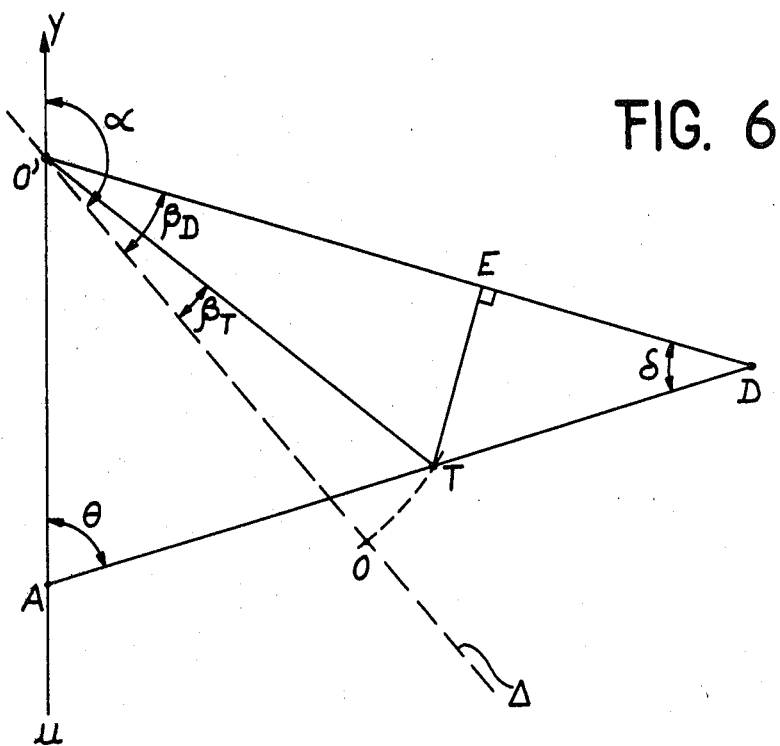
FIG. 6 shows the angles involved in optimally calculating the angle of the reference direction.

FIG. 6 shows the angles involved in calculating in optimal manner the angle of correction of the position of the torch. In this diagram, $\Delta$ is the reference direction of the head whilst E designates the projection of T on O'D.

The direction TD obtained by the preceding calculation is only an approximation of the secant direction to the joint. In fact, during the trial on the model piece, the means for correcting the position of the torch are out of service, and the torch, guided by the operator's hand, may not be exactly on the joint. An iterative process is then imagined which involves a correction of the position of the torch which, at each pass, enables the orientation of the head to be re-adjusted. The following calculations may show that a similar member for calculating $\theta$ may be used by replacing $\beta_D$ by $\beta_D - \beta_T$ in the calculation of the arc tangent; an expression will be obtained of the form $\theta = \alpha + \gamma$ where $\gamma$ will be a function of O'T, O'D and $\beta_D$, $\beta_T$.

$$\tan \delta = ET/ED \text{ and } ED = ET/\tan \delta$$

In the triangle $$O'AD: \pi = \theta + (\pi - \alpha + \beta_D) + \delta$$

hence $$\delta = \alpha - \theta - \beta_D$$

As $$\sin(\beta_D - \beta_T) = (ET/O'T)$$

this results in $$ET = O'T \sin(\beta_D - \beta_T)$$

therefore $$ED = ET/\tan \delta = O'T \sin(\beta_D - \beta_T) \cdot (1/\tan \delta)$$

As $$O'D = O'E + ED$$

then:

$$O'D = O'T \sin(\beta_D - \beta_T)/\tan\delta + O'T \cos(\beta_D - \beta_T)$$

$$\text{hence: } \tan\delta = \frac{O'T \cdot \sin(\beta_D - \beta_T)}{O'D - O'T \cdot \cos(\beta_D - \beta_T)}$$

$$\text{hence: } \tan(\alpha - \theta - \beta_D) = \frac{O'T \sin(\beta_D - \beta_T)}{O'D - O'T \cdot \cos(\beta_D - \beta_T)}$$

$$\text{arc tan} \frac{O'T \cdot \sin(\beta_D - \beta_T)}{O'D - O'T \cos(\beta_D - \beta_T)} = \alpha - \theta - \beta_D$$

$$\text{and therefore: } \theta = \alpha + \beta_D - \text{arc tan} \frac{O'T \sin(\beta_D - \beta_T)}{O'D - O'T \cos(\beta_D - \beta_T)}$$

This expression of $\theta$ is of the same form as the one calculated previously:

$$\theta = \alpha + \beta_D - \text{arc tan} \frac{O'T \sin\beta_D}{O'D - O'T \cos\beta_D}$$

This calculation may be made in real time by an analog calculator of the type shown in FIG. 5. This calculator receives on the one hand the value $\beta_D$ of the angle of the detector with respect to the reference direction $\Delta$ and on the other hand the value $\alpha$ of the angle of the reference direction O'O of the welding head, with respect to a reference axis related to the holder.

Figure 7:
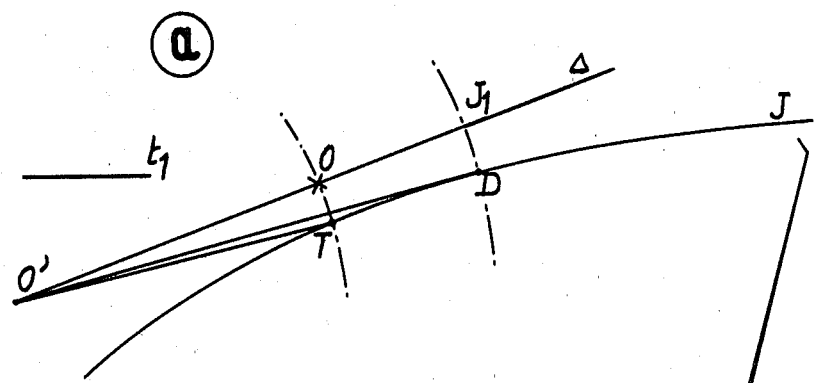
FIG. 7 illustrates at (a) and (b) the principle of correction of the position of the torch as a function of the speed of advance of the holder.
Figure 7:
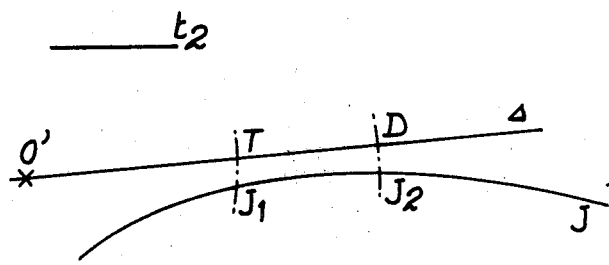

The principle of correction of the position of the torch as a function of the speed of advance of the holder is illustrated in diagrams (a) and (b) of FIG. 7.

At a given point, at instant $t_2$, a correction is made on the torch by a distance equal to the distance $DJ_1$ (joint-reference direction $\Delta$) which had been measured by the detector when the latter had passed over the same point at instant $t_1$ (FIG. 7 (a)).

At instant $t_2$, the distance joint-reference direction, on the path of the torch, obeys the relation: $TJ_1 = DJ_1$.

Therefore, knowing the value of the speed and the dimensions O'T and O'D, it is possible to known the instant when the correction of position of the torch must be effected, from the moment when this deviation datum was recorded by the detector.

If the angles are small, as shown in FIG. 8, it is possible, to calculate the angle $\beta_T$ of correction of the position of the torch, to write: $\widehat{DA} = \widehat{OT}$ and consequently $\beta_T = \beta_D \times (O'D'/O'T)$.

FIG. 9 shows in greater detail an automatic device according to the invention, for welding a joint J between two surfaces $T_1$ and $T_2$ constituted for example by sheets to be welded. This device comprises a holder P, mobile along the joint to be welded and supporting a welding head A; this welding head comprises a torch T' adapted to produce an electric arc, and a detector D' of optical type, for example, which detects the presence of the joint each time this detector and this joint are located opposite each other. It is obvious that this detector could be electromechanical or magnetic. The welding head A is mobile in rotation about the main axis OZ, related to the holder P, and substantially perpendicular to the surfaces $T_1$, $T_2$. The detector D' and the torch T' are mobile in rotation about the secondary axis O'Z', related to the head and parallel to the main axis OZ. The arrangement of the torch is such that, in the course of its rotation about the secondary axis O'Z', this torch passes through the main axis OZ. During the displacement of the holder in the direction of arrow 1, for example, the detector is located in front of the torch. The system also comprises means 2 for rotating the head A about the main axis OZ; these means are constituted for example by an electric motor 27, driving a system of pinions 3, 4, 5, so that the head may rotate about the axis OZ, in one of the directions indicated by the double arrow 6. Means 7, constituted by an electric motor 28 control a rod 8 via a known system 22, for converting the rotary movement of the motor into an oscillatory movement which leads the detector D' to scan the joint J by rotation about the secondary axis O'Z', related to the head A. The oscillations of the detector about axis O'Z' are represented by the double arrow 9. In the same way, means 10, constituted by the motor 29 driving the gears 11, 12, control the rotation of the torch about the secondary axis O'Z', in one of the directions indicated by double arrow 13, so as to bring this torch opposite the joint J. Finally, means constituted by the electric motor 30, driving the pinion 15 associated with the rack 16, enable the head A to be displaced in translation along the main axis OZ, in one of the directions of the double arrow 17.

Means 18 connected to the detector D' make it possible to record, before welding, the positions of the holder and the reference direction of the head along the joint, with respect to the fixed mark WXYZ. This system of detection has been described in detail in patent application No. EN 80 03068 filed on Feb. 12, 1980 in the name of present applicants. The reference direction of the head with respect to the fixed mark WXYZ is recorded before welding by the recording means 18 in the following manner: Each time the detector D' passes opposite the joint, the angle $\theta$ which this direction makes with the axis xy is calculated and recorded by the means 18. This angle is located due to means 20 for detecting the angular position of the head A, with respect to the reference axis WY; these detection means are not described in detail here; they may be constituted, for example, by a potentiometric detector or by any other type of angular coder. The angle of the detector with the reference direction Δ, is located by means 19 for detecting the angular position, comparable with the locating means 20. Thus, before welding, in the means 18 are recorded, on the one hand, the different positions of the holder along the joint, and, on the other hand, the references angles $\theta$ made by the reference direction Δ of the head, for each of these positions, with respect to the axis WY of the fixed mark WXYZ. This angle $\theta$ is calculated by means comparable to those of FIG. 5 and associated with the means 18. The means 19 which detect the angular position of the detector are connected for example to the rod 8.

The data concerning the position of the holder and the reference angle of the head are of course restored by the recording means 18 to the means (not shown) which control the displacement of the holder and to the motor 27 controlling the rotation of the head A through an angle $\theta$. The device comprises means 23 connected to the recording means 18 which, by action on the motor 29 driving the torch in rotation, correct the angular position thereof with respect to the prerecorded reference direction, so as to bring the torch above the joint J in the course of welding. Finally, the device comprises means for determining the speed of the holder during welding; the determination of this speed is important for determining the delay with which the correction of the position of the torch must be effected; these means are, in the embodiment described, constituted by means 24 for measuring the arc current of the torch T' of which the electrical supply has been shown at 25. These means may be of mechanical or electromechanical type. Known means 31 control the control voltage of the motor 30, which acts on the movement of translation of the head A, by the arc tension, so as to obtain an electric arc of constant height h. The means 23 comprise in particular a sampling circuit (not shown) which enables the recording of the position $\beta_D$ of the detector when the latter is above the joint and memorises the angle $\beta_T$ corresponding to the correction to be made on the torch after the time ΔT necessary for the holder to cover the distance d. It is at the end of the time gap ΔT that the correction means 23 apply rotation $\Delta_T$ to the torch. This is made possible by the fact that the speed V of the holder, proportional to the current of the torch obeys the relation V=(d/ΔT) and this results in ΔT (duration of memorisation of $\beta_T$) being equal to d/V. It is obvious that the height of arc h could be located from the arc voltage by another, even mechanical, means, a proximity detector for example, allowing servo-control of the motor 30.

What is claimed is:

1. Automatic, self-adapting process for welding a joint by fusion with the aid of a welding head which comprises a joint detector and a torch and which is supported by a holder mobile along the joint, this welding head being mobile in rotation about a main axis related to the holder and substantially perpendicular to the plane tangential to the surfaces to be welded at the location of the joint and being mobile in translation along this main axis, the torch and the detector being mobile in rotation about a secondary axis related to the head and parallel to the main axis, the torch passing through the main axis in the course of rotation about the secondary axis, the detector being in advance with respect to the torch, during the displacement of the holder, a reference direction being defined for all the degrees of freedom of the head when the above-mentioned axes as well as the axes of the torch and the detector are in the same plane; said process comprises the following steps of:

recording, during a trial operation prior to welding, the successive positions of the holder along the joint, determining for each of these positions in the course of this operation the direction of a straight reference line defined by the two points of intersection of the axis of the torch and of the axis of the detector with the outline of the joint on the surfaces of the pieces to be assembled and recording an electric voltage corresponding to the angular position of this reference direction;

measuring, in the course of welding and for each position of the holder, the angle of the detector with respect to the reference direction of the head, when the detector is above the joint;

correcting, in the course of welding following the trial operation, the angular position of the torch when the torch occupies the position previously occupied by the detector, by an angular displacement which is a funtion of the angular deviation of the detector with respect to the corresponding reference direction at this point of the joint and of the speed of displacement of the head on its path.

2. The process of claim 1, wherein the speed of displacement of the holder is determined from the intensity of the welding current.

3. The process of claim 1, wherein the height of the torch above the joint is controlled by the arc voltage in the course of welding.

4. The process of claim 1, wherein the height of the torch above the joint is adjusted by a proximity detector.

5. In an automatic, self-adapting device for welding a joint by fusion, comprising a welding head provided with a torch supported by a holder mobile along the joint to be welded, said device further comprises a joint detector forming part of the welding head, this head being mobile in rotation about a main axis related to the holder and substantially perpendicular to the plane tangential to the surfaces to be welded along the joint and being mobile in translation along this axis, the joint detector and the torch being mobile in rotation about a secondary axis related to the head and parallel to the main axis, the torch being able to pass through the main axis in the course of its rotation about the secondary axis and the detector being in advance with respect to the torch, during the displacement of the holder, means connected to the head, to the torch and to the detector to measure and record during a trial operation electric voltages corresponding to the angular positions of the elements subjected to the movements of rotation, located with respect to a reference direction which, for the detector and for the torch, is the plane defined by the main axis and the secondary axis and which, for the head, is a direction chosen arbitrarily with respect to the holder, means for locating and recording in the course of welding and for each predetermined position of the holder the angular position of the detector, with respect to its reference direction, when the detector is opposite the joint, and means for correcting, in the course of welding, the angular position of the torch with respect to its corresponding reference direction, when the torch occupies the position occupied previously by the detector along the joint, this correction being an angular displacement of the torch bringing said torch onto the joint, and being a function of the speed of displacement of the head on its path.

6. The automatic welding device of claim 5, wherein it further comprises means for rotating the head about the main axis, through reference angles corresponding to the positions of the holder and for displacing the head in translation along this axis.

7. The automatic welding device of claim 5, wherein it further comprises means for bringing the detector above the joint during the trial operation and in the course of welding, by rotation about the secondary axis of the head, and means for measuring the angular position of the detector with respect to its reference direction.

8. The automatic welding device of claim 5, wherein the means for correcting the position of the torch comprise means for controlling its rotation about the secondary axis, from the voltages corresponding to the positions of the detector when it is on the joint and from the speed of the head on its path.

9. The automatic welding device of claim 8, wherein it further comprises means for measuring the speed of displacement of the holder along the joint.

10. The automatic welding device of claim 9, wherein the means for measuring the speed of the holder are constituted by means for measuring the welding current.

11. The automatic welding device of claim 9, wherein the means for controlling the rotation of the torch about the secondary axis are controlled by the means for measuring the speed of displacement of the holder.

12. The automatic welding device of claim 11, wherein it further comprises means for adjusting the height of the torch above the joint.

13. The automatic welding device of claim 12, wherein the means for adjusting the height of the torch comprise means for displacing the head in translation along the main axis, controlled by means for measuring the arc voltage.

14. The automatic welding device of any one of claims 5 to 13, wherein the detector is an optical detector.

15. The device of any one of claims 5 to 13, wherein the detector is an electrical detector.

16. The device of claim 15, wherein the detector is a detector of the eddy current type with reciprocating scanning.

17. The automatic welding device of claim 12, wherein the means for adjusting the height of the torch comprise means for displacing the head in translation along the main axis controlled by proximity detection means.

* * * * *